US012585113B2

(12) United States Patent (10) Patent No.: US 12,585,113 B2

Nishizawa et al. (45) Date of Patent: Mar. 24, 2026

(54) LAMINATED GLASS AND HEAD-UP DISPLAY SYSTEM

(71) Applicant: AGC INC., Tokyo (JP)

(72) Inventors: Yusuke Nishizawa, Tokyo (JP);
Shunsuke Sadakane, Tokyo (JP)

(73) Assignee: AGC INC., Tokyo (JP)

( * ) Notice: Subject to any disclaimer, the term of this
patent is extended or adjusted under 35
U.S.C. 154(b) by 328 days.

(21) Appl. No.: 18/387,605

(22) Filed: Nov. 7, 2023

(65) Prior Publication Data

US 2024/0069337 A1 Feb. 29, 2024

Related U.S. Application Data

(63) Continuation of application No.
PCT/JP2022/020984, filed on May 20, 2022.

(30) Foreign Application Priority Data

May 20, 2021 (JP) ................................. 2021-085617

(51) Int. Cl.
G02B 27/01 (2006.01)
B32B 17/10 (2006.01)
(52) U.S. Cl.
CPC .... *G02B 27/0101* (2013.01); *B32B 17/10036*
(2013.01); *B32B 17/10449* (2013.01);
(Continued)
(58) Field of Classification Search
CPC .......... G02B 27/0101; B32B 17/10036; B32B
17/10449
See application file for complete search history.

(56) References Cited

U.S. PATENT DOCUMENTS 10,358,087 B2 7/2019 Kurihara

FOREIGN PATENT DOCUMENTS

CN 104267498 A 1/2015
CN 205899054 U 1/2017
(Continued)

OTHER PUBLICATIONS

International Search Report issued Jul. 26, 2022 in PCT/JP2022/
020984 (with English translation), 6 pages.

*Primary Examiner* — Lucy P Chien
(74) *Attorney, Agent, or Firm* — Element IP, PLC

(57) ABSTRACT

A laminated glass includes a first glass plate, a second glass
plate, and an interlayer disposed between the first glass plate
and the second glass plate to bond the first glass plate and the
second glass plate; the laminated glass partly having a first
area configured to be used by a head-up display; the first
glass plate having a 4th surface disposed on an opposite side
of the interlayer, and a 3rd surface facing the interlayer; the
second glass plate having a 2nd surface facing the interlayer
and a 1st surface disposed on an opposite side of the
interlayer; the first area having a P-polarized light reflective
layer disposed on the 4th surface and a light-absorbing layer
disposed at a position closer to the 1st surface than the
P-polarized light reflective layer; the laminated glass being
configured such that the formula of A≥85% is satisfied
wherein the total of a visible light transmittance of the
P-polarized light reflective layer and a visible light trans-
mittance of the light-absorbing layer is Tv %, the total of a
visible light reflectance of the P-polarized light reflective
layer and a visible light reflectance of the light absorbing
layer is Rv %, and an absorption A is equal to "100–Tv–Rv"
(%); and the laminated glass being configured such that the
formula of Rvp≥5% is satisfied wherein the total of a
P-polarized light reflectance of the P-polarized light reflec-
tive layer and a P-polarized light reflectance of the light-
(Continued)

10 absorbing layer is Rvp % when P-polarized light is incident on the surface of the laminated glass facing the P-polarized light reflective layer at an incident angle of 57 deg.

11 Claims, 4 Drawing Sheets

(52) U.S. Cl.
 CPC .. *B32B 17/10541* (2013.01); *B32B 17/10568* (2013.01); *B32B 17/10651* (2013.01); *B32B 17/10761* (2013.01); *B32B 2457/20* (2013.01); *G02B 2027/0118* (2013.01)

(56) References Cited

FOREIGN PATENT DOCUMENTS

| | | | | |
|---|---|---|---|---|
| CN | 111051958 A | | 4/2020 | |
| CN | 113238378 A | * | 8/2021 | ............. B60K 35/23 |
| JP | 2017538141 A | | 12/2017 | |

\* cited by examiner

LAMINATED GLASS AND HEAD-UP DISPLAY SYSTEM

TECHNICAL FIELD

The present invention relates to a laminated glass and a head-up display system.

BACKGROUND ART

In recent years, there has been a trend toward the introduction of a head-up display (hereinbelow, also referred as HUD), which reflects an image on the windshield of a vehicle to display certain information in a passenger's field of vision. One of the challenges in the HUD is to improve the visibility of a HUD image. For that purpose, an attempt has been made to reduce the occurrence of a double image.

As an example, there is a technology to clearly project a HUD image mainly only by reflection on a P-polarized light reflective layer with the occurrence of a double image being reduced by providing a laminated glass with a P-polarized light reflective layer made of a coating or film that reflects P-polarized light and causing the P-polarized light to enter into the laminated glass.

PRIOR ART DOCUMENTS

Patent Documents

Patent Document 1: JP-A-2017-538141

DISCLOSURE OF INVENTION

Technical Problem

If P-polarized light enters the laminated glass at an incident angle other than 57 deg (Brewster angle) under the technology, the reflection on the outer or inner principal surface of the laminated glass, however, increases to make a double image noticeable such that the visibility of the HUD image is lowered.

The present invention has been made in consideration of the above point. It is an object of the present invention to reduce the occurrence of a double image to improve the visibility of a HUD image in a laminated glass, which includes a P-polarized light reflective layer.

Solution to Problem

The laminated glass according to one mode of the disclosure includes a first glass plate, a second glass plate, and an interlayer disposed between the first glass plate and the second glass plate to bond the first glass plate and the second glass plate; the laminated glass partly having a first area configured to be used by a head-up display; the first glass plate having a 4th surface disposed on an opposite side of the interlayer, and a 3rd surface facing the interlayer; the second glass plate having a 2nd surface facing the interlayer and a 1st surface disposed on an opposite side of the interlayer; the first area having a P-polarized light reflective layer disposed on the 4th surface and a light-absorbing layer disposed at a position closer to the 1st surface than the P-polarized light reflective layer; the laminated glass being configured such that the formula of A≥85% is satisfied wherein the total of a visible light transmittance of the P-polarized light reflective layer and a visible light transmittance of the light-absorbing layer is Tv %, the total of a visible light reflectance of the P-polarized light reflective layer and a visible light reflectance of the light absorbing layer is Rv %, and an absorption A is equal to "100−Tv−Rv" (%); and the laminated glass being configured such that the formula of Rvp≥5% is satisfied wherein the total of a P-polarized light reflectance of the P-polarized light reflective layer and a P-polarized light reflectance of the light-absorbing layer is Rvp % when P-polarized light is incident on the surface of the laminated glass facing the P-polarized light reflective layer at an incident angle of 57 deg.

Advantageous Effects of Invention

In accordance with the one mode of the disclosure, it is possible to reduce the occurrence of a double image to improve the visibility of a HUD image in a laminated glass, which includes a P-polarized light reflective layer.

BRIEF DESCRIPTION OF DRAWINGS

FIGS. 2A and 2B are schematic views exemplifying the laminated glass according to the first embodiment, wherein FIG. 2A is a schematic view illustrating how the laminated glass is visually viewed from a vehicle inner side toward a vehicle outer side, and FIG. 2B is an enlarged cross-sectional and partial view taken along line A-A of FIG. 2A.

FIGS. 4A and 4B are views exemplifying the laminated glass according to the second embodiment, wherein FIG. 4A is a schematic view illustrating how the laminated glass is visually viewed from a vehicle inner side toward the vehicle outer side, and FIG. 4B is an enlarged cross-sectional and partial view taken along line B-B of FIG. 4A.

DESCRIPTION OF EMBODIMENTS

Now, embodiments of the present invention will be described in reference to the accompanying drawings. In Drawings, identical or corresponding members or elements are denoted by like references, and repeated explanation of such members or elements will be avoided on some occasions. The scales or shapes in Drawings are partly illustrated in an exaggerated manner so as to readily understand the invention on some occasions.

A typical example of the vehicle is an automobile, and the vehicle should be construed to mean a moving body with a laminated glass being mountable thereto, including an electric train, a ship, an airplane and the like.

In Description, the wording "in plan view" means to view an object from a normal direction passing through the center of gravity of a principal surface of the object. A shape viewed in this direction is called a planar shape.

In Description, the wordings "upper" and "lower" mean upper and lower in a state where a laminated glass is mounted to a vehicle.

The outermost peripheral side of a certain member is called "peripheral edge". The area having a width and inscribed to the "peripheral edge" in a certain member is called "peripheral edge portion".

First Embodiment

HUD System

Figure 1:
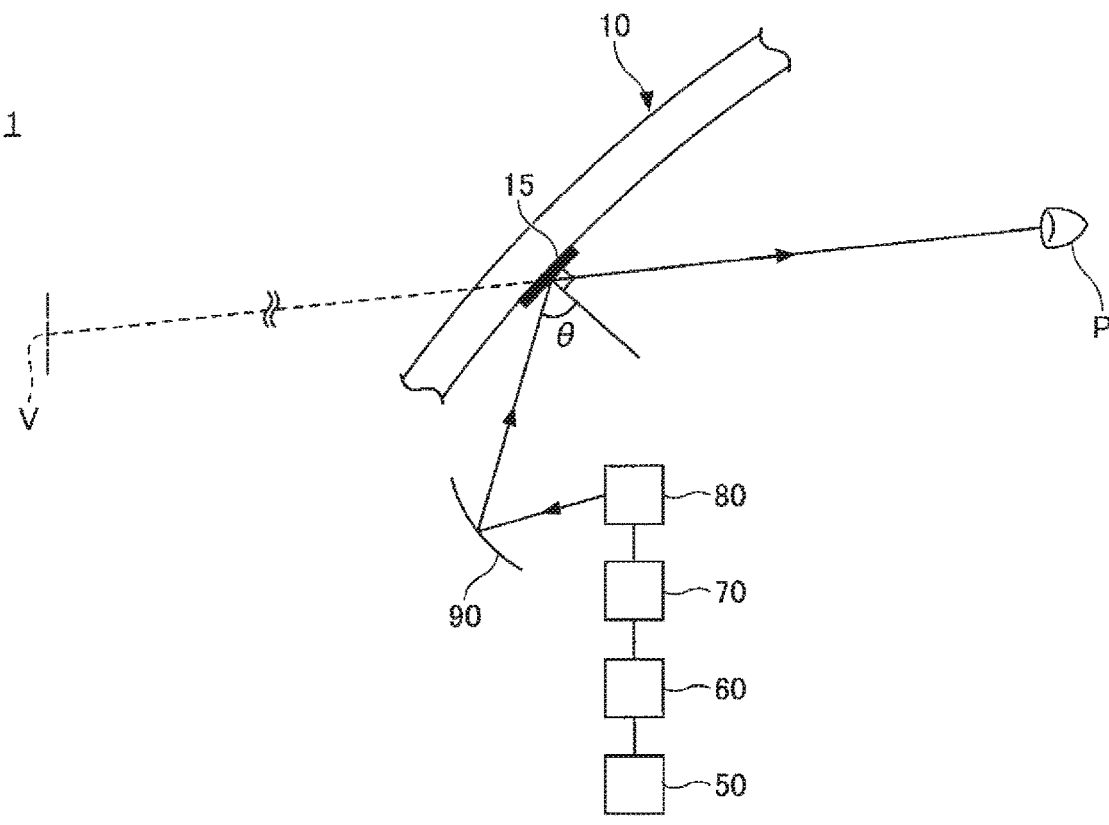
FIG. 1 is a schematic view exemplifying the HUD system according to a first embodiment.

FIG. 1 is a schematic view exemplifying the HUD system according to a first embodiment. The HUD system 1 illustrated in FIG. 1 includes a laminated glass 10, a light source 50, a first optical system 60, an image display element 70, a second optical system 80, and a concave mirror 90. The HUD system 1 is a vehicle head-up display system, which apparently displays a ghost image V on an outer side of the laminated glass 10 as viewed by a passenger having a viewpoint position P. In the HUD system 1, the first optical system 60 and the second optical system 80 may be disposed as required.

The laminated glass 10 is, for example, a vehicle windshield, where P-polarized visible light is incident from a vehicle inner side. The laminated glass 10 includes a P-polarized light reflective layer 15 in an area where P-polarized visible light is incident after being reflected on the concave mirror 90.

The light source 50 is a light source for emitting P-polarized visible light, such as a light-emitting diode or a laser. The light source 50 may include an optical member, such as a polarizing plate for converting S-polarized light into P-polarized light, or a lens. The light source 50 may include three light sources, i.e., a red light source, a green light source and a blue light source, for example.

The first optical system 60 may include a prism for combining light emitted from a plurality of light sources, a lens or the like, for example. The image display element 70 is an element for generating an intermediate image, which may be a liquid crystal display element or an organic electroluminescent element, for example. The second optical system 80 may include a lens, a reflective mirror or the like, for example. The concave mirror 90 is an optical member for reflecting the intermediate image on a reflective surface having a certain curvature. The concave mirror 90 is disposed at the position closest to the laminated glass 10 among the optical members disposed in an optical path between the light source 50 and the laminated glass 10.

In the HUD system 1, light emitted from the light source 50 reaches, via the first optical system 60, the image display element 70, and the image display element 70 produces an intermediate image. The intermediate image produced by the image display element 70 is projected on the P-polarized light reflective layer 15 on the laminated glass 10, being enlarged via the second optical system 80 and the concave mirror 90. The intermediate image projected on the P-polarized light reflective layer 15 is directed to the passenger's viewpoint position P, being mainly reflected by the P-polarized light reflective layer 15. The passenger recognizes the intermediate image as a ghost image V (HUD image) being apparently beyond the laminated glass 10. The passenger may be a driver, for example.

In FIG. 1, symbol θ indicates the incident angle of the P-polarized visible light when the P-polarized visible light is incident on the P-polarized light reflective layer 15 via a certain optical system after being emitted from the light source 50. The incident angle θ may be 57 deg (Brewster angle), greater than 57 deg, or smaller than 57 deg. In the HUD system 1, even when the incident angle θ is not 57 deg, it is possible to obtain a HUD image such that a primary image is displayed in a sufficiently bright way while the occurrence of a double image is reduced, which will be described later. When the light from the light source 50 is preferably incident on the P-polarized light reflective layer 15 at a greater incident angle than 57 deg, it is possible advantageously to increase the effect to reduce the occurrence of a double image. The light from the light source 50 is preferably incident on the P-polarized light reflective layer 15 at an incident angle of smaller than 47 deg or greater than 62 deg.

It is sufficient that the HUD system 1 includes at least the laminated glass 10 and the light source 50. It is optional that the HUD system includes another member. The HUD system 1 may be of a laser scanning type where a laser beam is scanned by an optical scanning unit made of, e.g., MEMS (Micro Electro Mechanical Systems).

Laminated Glass

Figure 2A:
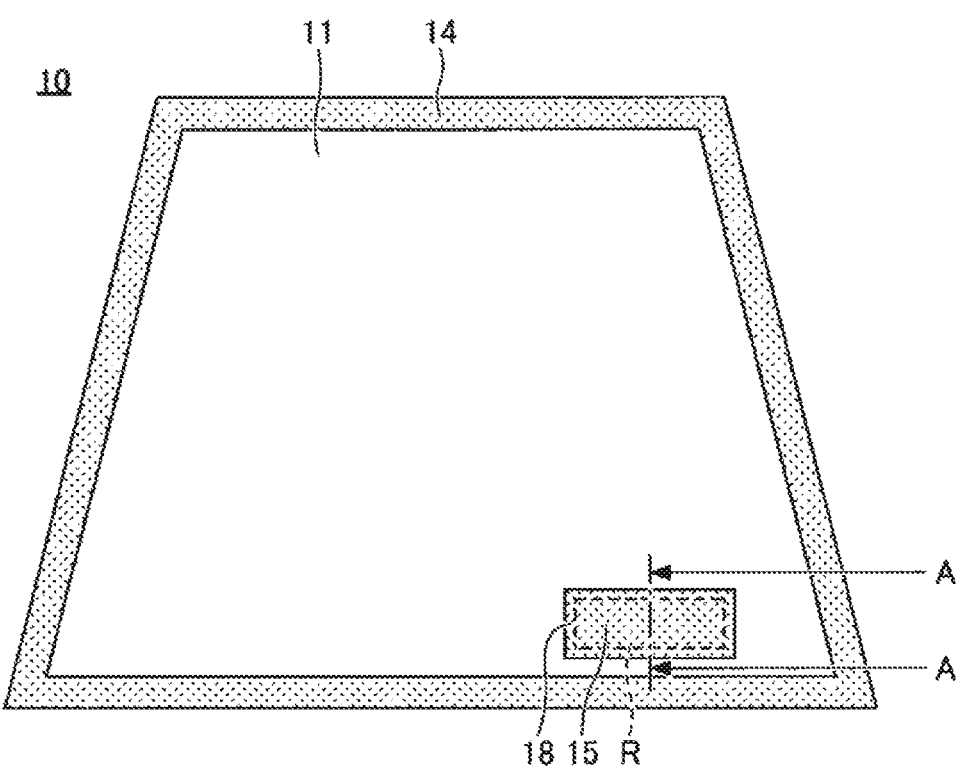
Figure 2B:
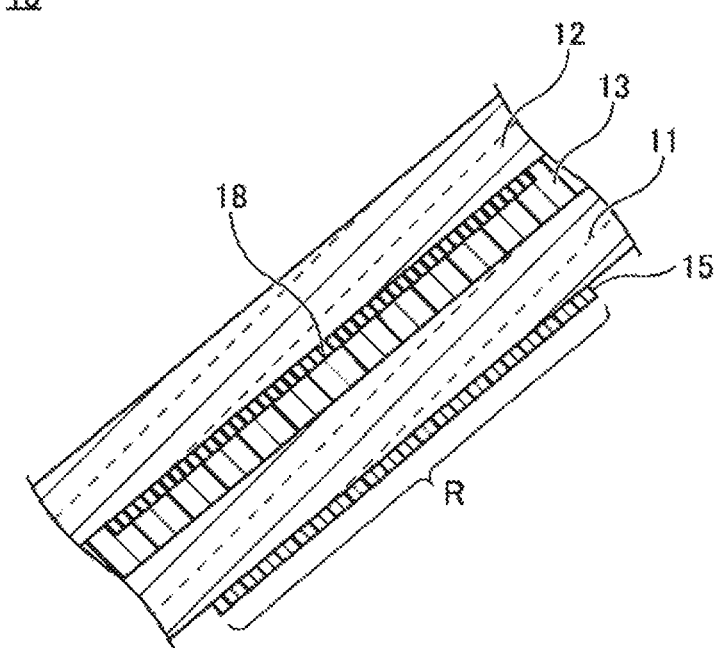

FIGS. 2A and 2B are schematic views exemplifying the laminated glass according to the first embodiment, wherein FIG. 2A is a schematic view illustrating how the laminated glass is visually viewed from the vehicle inner side toward a vehicle outer side, and FIG. 2B is an enlarged cross-sectional and partial view taken along line A-A of FIG. 2A.

As illustrated in FIGS. 2A and 2B, the laminated glass 10 is a vehicle laminated glass, which includes a first glass plate 11, a second glass plate 12, an interlayer 13, an optically shielding layer 14, the P-polarized light reflective layer 15, and a light-absorbing layer 18. The laminated glass 10 is applicable to a vehicle windshield, for example.

The first glass plate 11 and the second glass plate 12 are bonded together via the interlayer 13. The first glass plate 11 is disposed on a first side that is the vehicle inner side when the laminated glass 10 is mounted to a vehicle. The second glass plate 12 is disposed on a second side that is the vehicle outer side when the laminated glass 11 is mounted to the vehicle. The optically shielding layer 14 may be disposed as required.

The laminated glass 10 may be formed in, e.g., a complexly bent shape, which is curved in both vertical and horizontal directions when being mounted to the vehicle. The complexly bent shape includes not only the shape curved in vertical and horizontal directions when being mounted to the vehicle, but also a shape curved in at least two different directions. Or the laminated glass 10 may be formed in a single bent shape curved only in a vertical direction or a horizontal direction when being mounted to the vehicle. It should be noted that the single bent shape includes not only the bent shape curved only in a vertical direction or a horizontal direction when being mounted to the vehicle, but also a bent shape curved only in a single desired direction.

The laminated glass 10 is preferably curved so as to be convex toward the vehicle outer side. In other words, the second glass plate 12 is preferably curved so as to be convex toward an opposite direction of the interlayer 13 while the first glass plate 11 is preferably curved so as to be convex toward the interlayer 13. Although the laminated glass 10 is shown in FIG. 2A to be formed in a trapezoidal shape in plan view, the laminated glass 10 is not limited to be formed in a trapezoidal shape. The laminated glass may be formed in any shape including, e.g., a rectangular shape.

The first glass plate 11 is a vehicle inner side glass plate disposed on the vehicle inner side (first side) when the laminated glass 10 is mounted to the vehicle. The second glass plate 12 is a vehicle outer side glass plate disposed on the vehicle outer side (second side) when the laminated glass 10 is mounted to the vehicle.

The laminated glass 10 has a minimum value of preferably at least 500 mm and at most 100,000 mm in radius of curvature. The first glass plate 11 and the second glass plate 12 may have the same radius of curvature or different radiuses of curvature. When the first glass plate 11 and the second glass plate 12 have different radiuses of curvature, the first glass plate 11 preferably has a smaller radius of curvature than the second glass plate 12.

The first glass plate 11 and the second glass plate 12 are a pair of glass plates opposing each other. The interlayer 13 is disposed between the paired glass plates. The first glass plate 11 and the second glass plate 12 are fixed together with the interlayer 13 sandwiched therebetween. The interlayer 13 is a film, which bonds the first glass plate 11 and the second glass plate 12.

The interlayer 13 has an outer peripheral lateral side preferably subjected to edge treatment. In other words, the outer peripheral lateral side of the interlayer 13 is preferably processed not to largely project from the outer peripheral lateral sides of the first glass plate 11 and the second glass plate 12. It is preferable in terms of not impairing the appearance that the outer peripheral lateral side of the interlayer 13 projects from the outer peripheral lateral sides of the first glass plate 11 and the second glass plate 12 by a projection amount of at most 150 μm. The first glass plate 11, the second glass plate 12 and the interlayer 13 will be described in more details.

The optically shielding layer 14 is an opaque layer, which is disposed in a strip form along a peripheral edge portion of the laminated glass 10. The optically shielding layer 14 may be an opaque and colored ceramic layer, for example. The optically shielding layer 14 may have an optional color. The color is preferably a dark color, such as black, brown, gray or deep blue, and black is more preferable. The optically shielding layer 14 may be a colored interlayer or colored film having translucency, a combination of a colored interlayer and a colored ceramic layer, or a layer having a dimming function. The colored film may be formed integral with an infrared ray reflective film or the like.

The optically shielding layer 14 has a width of, e.g., about 10 mm to about 250 mm, preferably 20 mm to 220 mm, more preferably 30 mm to 200 mm, in plan view. When the opaque optically shielding layer 14 is disposed on the laminated glass 10, an adhesive, which is made of a resin, such as urethan, for holding the peripheral edge portion of the laminated glass 10 to the vehicle body, can be prevented from being deteriorated by an ultraviolet ray.

The optically shielding layer 14 may be formed by, e.g., using screen printing or the like to apply a ceramic color paste to a glass plate and baking the ceramic color paste, the ceramic color paste including meltable glass frits containing black pigment. The method of forming the optically shielding layer is not limited to this method. The optically shielding layer 14 may be formed by, e.g., using screen printing or the like to apply an organic ink to a glass plate and drying the organic ink, the organic ink containing black or dark pigment.

The optically shielding layer 14 is disposed only on a peripheral edge portion of a vehicle inner side principal surface of the second glass plate 12, for example. The optically shielding layer 14 may be disposed only on a peripheral edge portion of a vehicle inner side principal surface of the first glass plate 11, or may be disposed on both of the peripheral edge portions of the vehicle inner side principal surface of the first glass plate 11 and the vehicle inner side principal surface of the second glass plate 12. It should be noted that when the optically shielding layer 14 is disposed on the peripheral edge portion of the vehicle inner side principal surface of the first glass plate 11, the optically shielding layer 14 is disposed at a position on the first glass plate outside a HUD display area R.

In the laminated glass 10, the HUD display area R is defined, for use by the HUD, in an area surrounded by the optically shielding layer 14 in plan view. The HUD display area R is not limited to be disposed at a single position. In the area surrounded by the optically shielding layer 14, the HUD display area R may be disposed at each of plural positions, which are separated from each other in a vertical direction or in a horizontal direction, for example.

The HUD display area R is a display area where an image projected from a cabin is reflected to display information. The HUD display area R is a range where light from the light source 50 is irradiated on the laminated glass 10 when a HUD display position is moved in an eye box in accordance with SAE International SURFACE VEHICLE STANDARD J1757-2(2018). The HUD display area R may be disposed at any position within a range having a width of at most 400 mm in a lower side portion of the laminated glass 10.

The HUD display area R is disposed, for example, on a lower position of the laminated glass 10. In the HUD display area R and its adjacent area, the first glass plate 11 has the P-polarized light reflective layer 15 disposed on the vehicle inner side principal surface. It is sufficient that the P-polarized light reflective layer 15 is disposed so as to contain the entire HUD display area R. The P-polarized light reflective layer may be disposed on the entire vehicle inner side surface of the laminated glass plate. When the P-polarized light reflective layer 15 is disposed on the entire vehicle inner side surface of the laminated glass plate, or when the P-polarized light reflective layer 15 has an edge portion disposed on the optically shielding layer 14, it is advantageous because the boundary between the area where the P-polarized light reflective layer 15 is disposed and its peripheral area cannot be visibly recognized.

The P-polarized light reflective layer 15 is a layer, by which P-polarized visible light incident from the concave mirror 90 is reflected toward the vehicle inner side, for example, a P-polarized light reflective coating, which is coated on the vehicle inner side principal surface of the first glass plate 11. The P-polarized light reflective layer 15 may be made of a P-polarized light reflective film and be bonded to the vehicle inner side principal surface of the first glass plate 11 via an adhesive layer. The P-polarized light reflective layer 15 is transparent to visible light.

As the P-polarized light reflecting layer 15, it is possible to employ, for example, a film or the like containing a birefringent interference polarizer including a polymer multilayer film made of two or more polymers having different refractive indexes, a polarizer having microscopic asperities so-called a wire grid type, or a polarizer made of a cholesteric liquid crystal layer. When a P-polarized light reflective film is employed as the P-polarized light reflective layer 15, the P-polarized light reflective film has a thickness of preferably at least 25 μm and at most 200 μm. The P-polarized light reflective film has a thickness of more preferably at most 150 μm, further preferably at most 100 μm.

The use of a P-polarized light reflective coating as the P-polarized light reflective layer 15 is more preferable than the use of a P-polarized light reflective film from a viewpoint that the visibility is excellent in a low luminance state, e.g., at night, and in a wider field of view. The use of a P-polarized light reflective coating is also preferable from a viewpoint that control of, e.g., the thickness is easier, and the reflective surface tends to be smooth, whereby the HUD image will be less likely to be distorted.

Further, the use of a P-polarized light reflective coating allows the kind of a proper black ceramic layer to be appropriately selected so as to obtain desired optical performance and chromaticity according to a bending method or the composition of the coating because black ceramic color paste is applied to a coated glass plate and backed, followed by bending the glass plate. In particular, in some kinds of the laminated glass, an inner glass plate (with a P-polarized light reflective coating) and an outer glass plate (with a 2nd surface black ceramic layer) are required to be simultaneously bent. In the case of such a laminated glass, the preferable bending conditions vary according to the kind of the coating. To this point, the material for a black ceramic layer can be advantageously selected so as to be suited for the required bending conditions.

When a P-polarized light reflective coating is employed as the P-polarized light reflective layer 15, the P-polarized light reflective coating has a thickness of, e.g., at least 50 nm and at most 500 nm.

Examples of the P-polarized light reflective coating include a film having some extent of reflection rate, such as a film having a layered structure of a high refractive index film and a low refractive index film, or a Low-e film. Among them, a film having a layered structure of a high refractive index film and a low refractive index film is preferable in terms of being capable of maintaining a P-polarized light reflection rate at a high level.

The high refractive index film has a refractive index of preferably at least 1.8, at least 1.9, at least 2.0 or at least 2.1 and at most 2.5 for a wavelength of 550 nm. The low refractive index film has a refractive index of preferably and typically less than 1.8, at most 1.7 or at most 1.6, and at least 1.2 for a wavelength of 550 nm.

Specifically, the high refractive index film preferably includes at least one of the following substances:

an oxide of Zr, Nb or Sn; a mixed oxide of Ti, Zr, Nb, Si, Sb, Sn, Zn or In; a nitride of Si and Zr; or a mixed nitride of Si or Zr The low refractive index film preferably includes at least one of the following substances:

a silicon oxide; a silicon oxynitride; a silicon oxycarbide; or a mixture thereof, such as a mixed oxide of silicon and aluminum, or a mixed oxide of silicon and zirconium The high refractive index film has a first layer optionally made of one or a plurality of sublayers. The first layer of the high refractive index film has a thickness (geometric film thickness) of 50 nm to 100 nm, in particular preferably 60 nm to 80 nm. The low refractive index film has a first layer optionally made of one or a plurality of sublayers. The first layer of the low refractive index film has a thickness (geometric film thickness) of 70 nm to 160 nm, in particular preferably 80 nm to 120 nm.

The P-polarized light reflecting coating may be formed on the surface of a glass plate by, for example, a sputtering method or a CVD method.

In general, in a HUD system having a P-polarized light reflective layer, its light source and optical system are disposed such that the incident angle of P-polarized light incident on the P-polarized light reflective layer is set at 57 deg or its close value. The incident angle $\theta$ may shift from 57 deg because the light source or the optical system is required to be disposed at a limited position in a cabin.

In the HUD system 1, the incident angle $\theta$ tends to increase as the HUD display area R, e.g., the installed angle of the laminated glass 10 to a vehicle, decreases. P-polarized visible light incident to the laminated glass 10 from the vehicle inner side is refracted and reaches the vehicle outer side of the second glass plate 12. When the incident angle $\theta$ shifts from the Brewster angle (57 deg), the amount of light reflecting on the vehicle outer side of the second glass plate increases. Specifically, when the incident angle $\theta$ is at least 62 deg (for example, the incident angle $\theta$ is 67 deg or 72 deg), the amount of light reflected on the vehicle outer side of the second glass plate 12 increases, being made easily visible. For this reason, when P-polarized visible light is incident to the laminated glass 10 at an angle out of the Brewster angle, a ghost image may be seen in a separated way in some cases. The image that is separately seen is a double image. The formation of such a double image reduces the visibility of a HUD image. It should be noted that when the incident angle $\theta$ decreases to, e.g., at most 47 deg, the problem of a double image is noticeable as well.

From this viewpoint, the light-absorbing layer 18 is disposed in a position closer to the vehicle outer side than the P-polarized light reflective layer 15 in the HUD display area R on the laminated glass 10 in order to reduce the occurrence of a double image even when the incident angle $\theta$ shifts from 57 deg. In other words, the light-absorbing layer 18 is disposed in a position that is closer to the vehicle outer side than the P-polarized light reflective layer 15 and overlaps with the entire P-polarized light reflective layer 15 when seeing the first glass plate 11 from the vehicle inner side in plan view. The light-absorbing layer 18 may be disposed on the principal surface of the vehicle inner side of the second glass plate 12, for example. The light-absorbing layer 18 may be disposed on the principal surface of the vehicle outer side of the first glass plate 11. The light-absorbing layer 18 may be sealed in the interlayer 13. The light-absorbing layer 18 may be disposed so as to extend around and beyond the HUD display area R.

When the first glass plate 11 has a 4th surface disposed on an opposite side of the interlayer 13, the first glass plate 11 has a 3rd surface facing the interlayer 13, the second glass plate 12 has a 2nd surface facing the interlayer 13, and the second glass plate 12 has a 1st surface disposed on an opposite side of the interlayer 13, the P-polarized light reflective layer 15 is disposed on the 4th surface in the HUD display area R, and the light-absorbing layer 18 is disposed at a position in the laminated glass 10 closer to the 1st surface than the P-polarized light reflective layer 15 in a direction toward the 1st surface. In the embodiment shown in FIG. 2B, the P-polarized light reflective layer 15 is disposed on the 4th surface while the light-absorbing layer 18 is disposed on the 2nd surface.

The light-absorbing layer 18 may be, for example, an opaque colored ceramic layer as in the optically shielding layer 14. In this case, the light-absorbing layer may have an optional color. The color is preferably a dark color, such as black, brown, gray or deep blue. Among them, black is more preferable. The light-absorbing layer 18 is made of a mixture of an inorganic binder component and an inorganic powder component. Specifically, examples of the inorganic binder component include $Bi_2O_3$—$SiO_2$ and ZnO—$SiO_2$ while examples of the inorganic powder component include $MnO_2$, $Al_2O_3$ and $TiO_2$. The weight ratio of the inorganic binder component and the inorganic powder component is preferably 80:20 to 60:40. Among them, it is preferable in terms of enhancing the effect of the invention that the light-absorbing layer is made of a material wherein the inorganic binder component is black ceramic paste ($Bi_2O_3$—$SiO_2$), the inorganic powder component is a $MnO_2$, and the inorganic binder component and the inorganic powder component are contained in a weight ratio of 80:20 to 60:40.

The light-absorbing layer 18 may be made of a smoke film. The light-absorbing layer 18 may be a layer having a dimming function. Examples of the layer having a dimming function include a suspended particle device (SPD), a polymer dispersed liquid crystal (PDLC), and a polymer network liquid crystal (PNLC). The layer having a dimming function may be sealed in, e.g., the interlayer.

Figure 3:
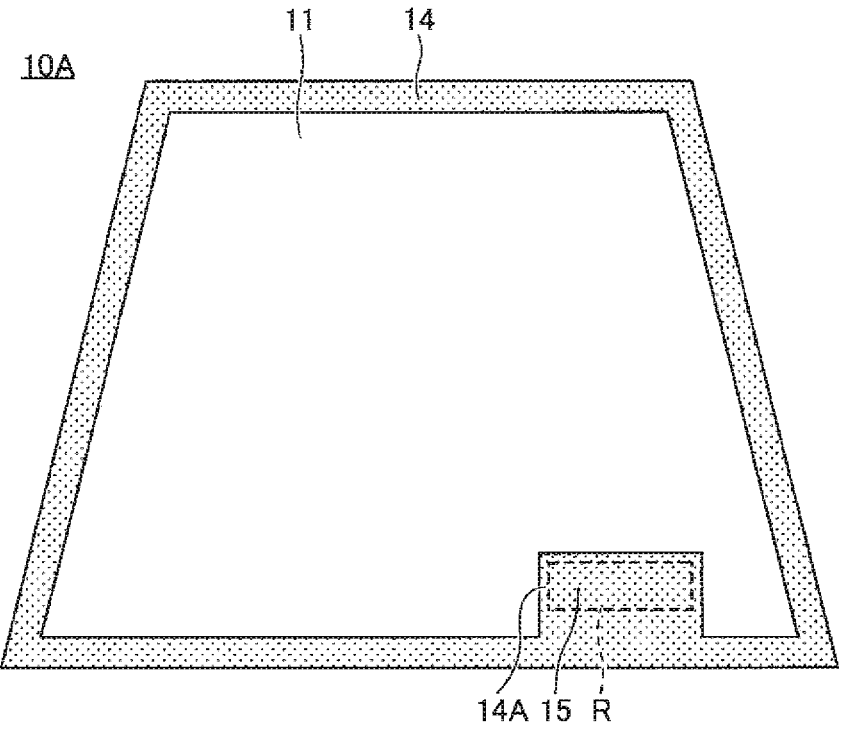
FIG. 3 is a schematic view exemplifying the laminated glass according to a modification of the first embodiment.

When the optically shielding layer 14 is disposed on a peripheral edge portion of the 2nd surface, and when the light-absorbing layer is disposed on the 2nd surface, being made of the same material as the optically shielding layer 14, the light-absorbing layer may be disposed so as to be continuous to the optically shielding layer 14 as in the light-absorbing layer 14A of the laminated glass 10A shown in FIG. 3. In other words, the optically shielding layer 14 may be partly widened so as to form a light-absorbing layer 14A. This arrangement can simplify the production process of the laminated glass 10 because no process for forming the light-absorbing layer 14A is required independently. In the embodiment shown in FIG. 3, the HUD display area R may have a lower portion disposed in the optically shielding layer 14.

The laminated glass 10 is configured to satisfy the formula of A≥85% wherein the total of the visible light transmittance of the P-polarized light reflective layer 15 and the visible light transmittance of the light-absorbing layer 18 is Tv %, the total of the visible light reflectance of the P-polarized light reflective layer 15 and the visible light reflectance of the light-absorbing layer 18 is Rv %, and the light-absorbing layer has an absorptivity A equal to "100–Tv–Rv" (%). The absorptivity A preferably satisfies the formula of A≥90%, more preferably the formula of A≥95%. The visible light transmittance and the visible light reflectance may be measured by a method in compliance with JIS R3106:2019. The total Tv of the visible light transmittance of the P-polarized light reflective layer 15 and the visible light transmittance of the light-absorbing layer 18, and the total Rv of the visible light reflectance of the P-polarized light reflective layer 15 and the visible light reflectance of the light-absorbing layer 18 are values measured with respect to the laminated glass 10 including the first glass plate 11, the second glass plate 12 and the interlayer 13. These values are calculated by measuring spectral transmittance and spectral reflectance prescribed in JIS R3106:2019 using visible light as incident light, and making calculation based thereon in accordance with the calculation method for visible light transmittance and visible light reflectance described in JIS R3106:2019.

The laminated glass 10 is configured to satisfy the formula of Rvp≥5% wherein the total of the P-polarized light reflectance of the P-polarized light reflective layer 15 and the P-polarized light reflectance of the light-absorbing layer 18 is Rvp % when P-polarized light is incident, at an incident angle θ of 57 deg, on the surface of the laminated glass with the P-polarized light reflective layer 15 disposed thereon. Rvp satisfies preferably the formula of Rvp≥7%, more preferably the formula of Rvp≥10%. The value of Rvp is calculated by using a universal measurement spectrophotometer (such as a combination of Agilent Cary 7000 and a multi-angle variable automatic measurement spectrophotometer), setting a light source at an incident angle of 57 deg to the laminated glass 10, attaching a polarizing plate to the light source to make control such that the component of light incident to the laminated glass 10 is made P-polarized light, measuring spectral reflectance, and making calculation based thereon in accordance with the calculation method for visible light reflectance prescribed in JIS R3106:2019.

As described above, the laminated glass 10 is configured such that the light-absorbing layer 18 is disposed at a position closer to the vehicle outer side than the P-polarized light reflective layer 15 in the HUD display area R, and the absorptivity A is set to at least 85%. This arrangement can reduce the occurrence of a double image since it is possible to reduce the reflection on a surface of the laminated glass closer to the vehicle outer side than the P-polarized light reflective layer 15 even when the incident angle θ shifts from 57 deg. When the absorptivity A is at least 90%, it is possible to further reduce the occurrence of a double image. When the absorptivity A is at least 95%, it is possible to furthermore reduce the occurrence of a double image. The laminated glass 10 can exhibit significant effect to a reduction in the occurrence of a double image, in particular, when the incident angle θ largely shifts from 57 deg, such as 62 deg, 67 deg or 72 deg. This is also true for a case where the incident angle θ is at most 47 deg.

The laminated glass 10 can increase contrast in the HUD image to improve the visibility of the HUD image since the light-absorbing layer 18 is disposed at a position closer to the vehicle outer side than the P-polarized light reflective layer 15.

The laminated glass 10 can make a primary image sufficiently bright to improve the visibility of the HUD image since Rvp is at least 5% when P-polarized light is incident at an incident angle θ of 57 deg. In a case where P-polarized light is incident at an incident angle θ of 57 deg, when Rvp is at least 7%, the primary image is made brighter to further improve the visibility of the HUD image. In a case where P-polarized light is incident at an incident angle θ of 57 deg, when Rvp is at least 10%, the primary image is made much brighter to further improve the visibility of the HUD image.

The laminated glass 10 is configured to preferably satisfy the formula of a*≤10 and the formula of b*≤10 wherein light reflected on the P-polarized light reflective layer 15 and on the light-absorbing layer 18 has a chromaticity of a*, b* when P-polarized light is incident at an incident angle θ of 57 deg from the surface of the laminated glass closer to the P-polarized light reflective layer 15. This arrangement makes the chromaticity of the HUD image neutral. It is more preferable to satisfy the formula of a*≤7 and the formula of b*≤7, further preferable to satisfy the formula of a*≤5 and the formula of b*≤5. The latter arrangement makes the chromaticity of the HUD image more neutral. It should be noted that the chromaticity of (a*, b*) is a chromaticity value prescribed in JIS Z8781-4:2013, which is measured under a light source of D65.

In the HUD system 1, the HUD image is not preferably displayed at a boundary between the light-absorbing layer 18 and its peripheral area. This is because the HUD image is prevented from being distorted.

Now, the first glass plate 11, the second glass plate 12 and the interlayer 13 will be described in more detail.

Glass Plate

The first glass plate 11 and the second glass plate 12 may be made of inorganic or organic glass. As inorganic glass, for example, soda-lime glass, aluminosilicate glass, borosilicate glass, alkali-free glass, quartz glass, or the like may be used without any particular restrictions. The second glass plate 12 disposed on the outer side of the laminated glass 10 is preferably made of inorganic glass from the viewpoint of scratch resistance, and is preferably made of soda-lime glass from the viewpoint of moldability. When the first glass plate 11 and the second glass plate 12 are made of soda-lime glass, it is possible to advantageously use clear glass, green glass containing at least a certain amount of an iron component, or UV-cut green glass.

The inorganic glass may be either non-tempered glass or tempered glass. Non-tempered glass is one obtained by forming molten glass into a plate-shape, followed by annealing. Tempered glass is one having a compressive stress layer formed on the surface of non-tempered glass.

The tempered glass may be either physically tempered glass, such as air-cooled tempered glass, or chemically tempered glass. In the case of physically tempered glass, it is possible to temper the glass surface, for example, by forming a compressive stress layer on the glass surface by the temperature difference between the glass surface and the inside of the glass by an operation other than annealing, such as quenching a uniformly heated glass plate from a temperature near the softening point in bending molding.

In the case of chemically tempered glass, it is possible to temper the glass surface, for example, by forming a compressive stress on the glass surface by an ion exchange method or the like after bending. Further, it is possible to use glass that absorbs ultraviolet or infrared rays. Further, the first glass plate 11 and the second glass plate 12 are preferably transparent. Both glass plates may be made of glass plates that are colored to such an extent not to impair transparency.

On the other hand, as the material for the organic glass, a transparent resin, for example, polycarbonate, an acrylic resin such as polymethyl methacrylate, polyvinyl chloride, polystyrene, or the like, may be mentioned.

The first glass plate 11 and the second glass plate 12 are not limited to have a trapezoidal shape or rectangular shape, but may be processed into various shapes and curvatures. In order to bend the first glass plate 11 and the second glass plate 12, gravity molding, press molding, roll forming or the like may be used. There is no particular limitation to the forming method of the first glass plate 11 and the second glass 12. For example, in the case of inorganic glass, a glass plate formed by a float method or the like is preferably used.

The second glass plate 12 has a thickness of preferably at least 1.1 mm and at most 3 mm in its thinnest part. When the second glass plate 12 has a thickness of at least 1.1 mm, the laminated glass can have a sufficient strength, such as flying stone resistance or the like. When the second glass plate 12 has a thickness of at most 3 mm, the weight of the laminated glass 10 can be prevented from being too heavy, which is preferable from the viewpoint of vehicle fuel efficiency. The second glass plate 12 has a thickness of more preferably at least 1.8 mm and at most 2.8 mm, further preferably at least 1.8 mm and at most 2.6 mm, still more preferably at least 1.8 mm and at most 2.2 mm, further more preferably at least 1.8 mm and at most 2.1 mm in its thinnest part.

The first glass plate 11 has a thickness of preferably at least 0.3 mm and at most 2.3 mm. When the first glass plate 11 has a thickness of at least 0.3 mm, the laminated glass can have improved handleability. When the first glass plate has a thickness of at most 2.3 mm, the weight of the laminated glass can be prevented from being too heavy.

In a case where the first glass plate 11 has an inappropriate thickness, in particular, when the first glass plate 11 and the second glass plate 12 are made of two glass plates that have been formed so as to be deeply bent, the two glass plates may be mismatched in terms of shape, significantly affecting the glass quality, such as residual stress after press-bonding.

When the first glass plate 11 has a thickness set to at least 0.3 mm and at most 2.3 mm, it is possible to maintain a required glass quality, such as residual stress. It is particularly effective in terms of maintaining the glass quality in deeply bent glass that the first glass plate 11 has a thickness set to at least 0.3 mm and at most 2.3 mm. The first glass plate 11 has a thickness of more preferably at least 0.5 mm and at most 2.2 mm, further preferably at least 0.7 mm and at most 2.1 mm. When the first glass plate has a thickness within these ranges, the above-mentioned effect can be further made significant.

The first glass plate 11 and/or the second glass plate 12 may have a coating having a function for water repellency, ultraviolet or infrared cut, or a coating having low reflection or low radiation properties disposed on the outer side. The first glass plate 11 and/or the second glass plate 12 may have a coating having a function for ultraviolet or infrared cut, low radiation, visible light absorption, coloration or the like disposed on the side in contact with the interlayer 13.

In a case where the first glass plate 11 and the second glass plate 12 are made of inorganic glass having a curved shape, the first glass plate 11 and the second glass plate 12 are subjected to bending after being formed by a float method or the like and before being bonded by the interlayer 13. Bending is performed by softening the glass plates by heating. The heating temperature of the glass plates during bending may be controlled in a range of approximately 550° C. to approximately 700° C.

Interlayer

As the interlayer 13, a thermoplastic resin is used in many cases. For example, thermoplastic resins which have been used for this type of application, such as a plasticized polyvinyl acetal-based resin, a plasticized polyvinyl chloride-based resin, a saturated polyester-based resin, a plasticized saturated polyester-based resin, a polyurethane-based resin, a plasticized polyurethane-based resin, an ethylene-vinyl acetate copolymer-based resin, an ethylene-ethyl acrylate copolymer-based resin, a cycloolefin polymer resin, an ionomer resin, or the like, may be mentioned. Further, a resin composition containing the modified block copolymer hydride described in Japanese Patent No. 6065221 may be also appropriately applicable to the interlayer 13.

Among them, a plasticized polyvinyl acetal-based resin may be appropriately used because of being excellent in balance of various properties, such as transparency, weather resistance, strength, adhesive strength, penetration resistance, impact energy absorption, moisture resistance, heat shielding, and sound insulation. These thermoplastic resins may be used alone, or two or more types may be used in combination. The term "plasticized" in the above-mentioned plasticized polyvinyl acetal-based resin means that it is plasticized by addition of a plasticizer. The same applies to other plasticized resins.

When a certain member is sealed in the interlayer 13, the sealed member may be degraded by a certain plasticizer depending on the type of the sealed member. In such a case, it is preferable to use a resin that does not substantially contain such a plasticizer. As the resin that contains no plasticizer, an ethylene-vinyl acetate copolymer (EVA)-based resin or the like may be mentioned.

The above-mentioned polyvinyl acetal-based resin may be a polyvinyl formal resin obtainable by reacting polyvinyl alcohol (PVA) with formaldehyde, a polyvinyl acetal-based resin in a narrow sense obtainable by reacting PVA with acetaldehyde, a polyvinyl butyral (PVB) resin obtainable by reacting PVA with n-butyraldehyde, or the like. Among them, PVB is particularly appropriate because of being excellent in balance of various properties, such as transparency, weather resistance, strength, adhesive strength, penetration resistance, impact energy absorption, moisture resistance, heat shielding, and sound insulation. These polyvinyl acetal-based resins may be used alone, or two or more types may be used in combination.

It should be noted that the material for forming the interlayer 13 is not limited to a thermoplastic resin. The interlayer 13 may contain functional particles, such as an infrared absorber, an ultraviolet absorber, or a luminescent agent. The interlayer 13 may have a colored portion called a shade band. The coloring pigment to be used to form the colored portion may be one that can be used for plastics and is controlled in an adding amount such that the colored portion has a visible light transmittance of at most 40%. For example, an organic coloring pigment, such as azo, phthalocyanine, quinacridone, perylene, perinone, dioxazine, anthraquinone and isoindolino, and an inorganic coloring pigment, such as an oxide, a hydroxide, a sulfide, chromate, sulfate, carbonate, silicate, phosphate, arsenate, ferrocyanide, carbon, or metal powder, may be mentioned. These coloring pigments may be used alone, or two or more types may be used in combination.

The interlayer 13 may include a plurality of layers. For example, the interlayer 13 may include at least three layers. For example, when the interlayer is configured to include at least three layers, and when any of the layers except the layers on both sides has a shear modulus smaller than the shear modulus of the layers on both sides by, e.g., adjusting the plasticizer, the laminated glass 10 can have improved sound insulation property. In such a case, the shear modulus of the layers on both sides may be the same as or be different from each other.

The interlayer 13 has a film thickness of preferably at least 0.5 mm at its thinnest part. It should be noted that when the interlayer 13 includes a plurality of layers, the film thickness of the interlayer 13 is a total film thickness obtained by summing the film thicknesses of the respective layers. When the interlayer 13 has a thickness of at least 0.5 mm at its thinnest part, the impact resistance required for the laminated glass will be sufficient. The interlayer 13 has a thickness of preferably at most 3 mm at its thickest part. When the interlayer 13 has a thickness of at most 3 mm at the maximum, the weight of the laminated glass is prevented from being too heavy. The interlayer 13 has a thickness of more preferably at most 2.8 mm, further preferably at most 2.6 mm, at the maximum 13.

When the interlayer 13 includes a plurality of layers, the respective layers in the interlayer 13 are made of preferably the same material, although the respective layers may be made of different materials. It should be noted that at least 50% of the film thickness of the interlayer 13 is made of at least one of the above-mentioned materials from the viewpoint of adhesiveness between the first glass plate 11 and the second glass plate 12, or functional materials to be inserted into the laminated glass 10.

In order to prepare the interlayer 13, at least one of the above-mentioned resin materials to be used as the interlayer is appropriately selected, followed by using an extruder to extrusion-mold the selected material in a heated molten state, for example. The extrusion conditions, such as the extrusion speed of the extruder, are set to be uniform. The extrusion-molded resin film is then stretched as the case requires, for example, to provide curvature to its upper and lower sides in accordance with the design of the laminated glass, thereby completing the interlayer 13.

Laminated Glass

The laminated glass 10 has a total thickness of preferably at least 2.8 mm and at most 10 mm. When the laminated glass 10 has a total thickness of at least 2.8 mm, the laminated glass can secure sufficient rigidity. When the laminated glass 10 has a total thickness of at most 10 mm, the laminated glass can have not only sufficient transmittance but also reduced haze.

The laminated glass 10 is configured such that the mismatch between the first glass plate 11 and the second glass plate 12 is preferably at most 1.5 mm, more preferably at most 1 mm at at least one side of the laminated glass. The mismatch between the first glass plate 11 and the second glass plate 12 means the amount of misalignment between the outer peripheral lateral surface of the glass plate 11 and the outer peripheral lateral surface of the glass plate 12 in plan view.

It is advantageous in terms of not impairing the appearance that the mismatch between the first glass plate 11 and the second glass plate 12 is at most 1.5 mm at at least one side of the laminated glass 10. It is more advantageous in terms of not impairing the appearance that the mismatch between the first glass plate 11 and the second glass plate 12 is at most 1.0 mm at at least one side of the laminated glass 10.

In order to produce the laminated glass 10, the interlayer 13 is sandwiched between the first glass plate 11 and the second glass plate 12 to form a laminate. The laminate is then placed in a rubber bag, a rubber chamber, a resin bag or the like, and is bonded in a vacuum controlled in a gauge pressure range of −100 kPa to −65 kPa under a controlled temperature ranging from about 7° C. to about 110° C., for example. The heating conditions, the temperature conditions, and the lamination method may be appropriately selected.

The laminated glass 10 can be obtained, having more excellent durability by being subjected to a pressing process of heating and pressurizing under controlled conditions having a temperature range of 100° C. to 150° C., and an absolute pressure range of 0.6 MPa to 1.5 MPa, for example. In some cases, however, this heating and pressurizing process may not be used to simplify the process and to take into account the characteristics of the materials to be sealed in the laminated glass 10.

The laminated glass may be produced by a method so-called "cold bend" wherein the first glass sheet 11 and the second glass plate 12 are joined together in such a state that either one or both of them are in an elastically deformed state. The cold bend can be accomplished by using a laminate including the first glass plate 11, the interlayer 13 and the second glass plate 12, which are fixed by a temporary fixing means, such as a tape; a conventional pre-pressing device, such as a nip roller or rubber bag, or a rubber chamber; and an autoclave.

The laminated glass 10 may include, between the first glass plate 11 and the second glass plate 12, a film or a device having a function, such as an electric heating wire, infrared reflection, light emission, power generation, dimming, a touch panel, visible light reflection, scattering, decoration, absorption or the like in addition to the interlayer 13 to such an extent that the effects of the invention are not impaired. The laminated glass 10 may have a coating disposed thereon so as to achieve a function, such as antifogging, water repellency, heat shielding, or low reflection. The laminated glass 10 may have a coating disposed on the vehicle outer principal surface of the first glass plate 11 or the vehicle inner principal surface of the second glass plate 12 so as to achieve a function, such as heat shielding, or heat generation.

Second Embodiment

The second embodiment exemplifies an example where the laminated glass is wedge-shaped in cross section in the HUD system according to the first embodiment. Explanation of the second embodiment will be described while explanation of the same members or elements as those in the previously described embodiment is omitted on some occasions.

Figure 4A:
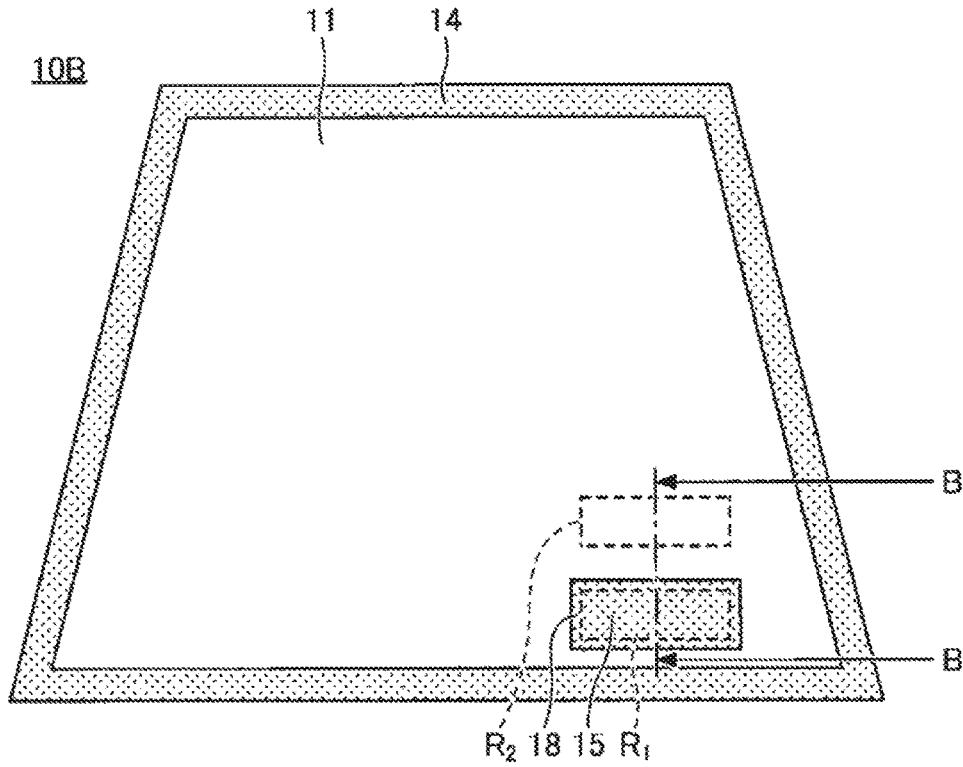
Figure 4B:
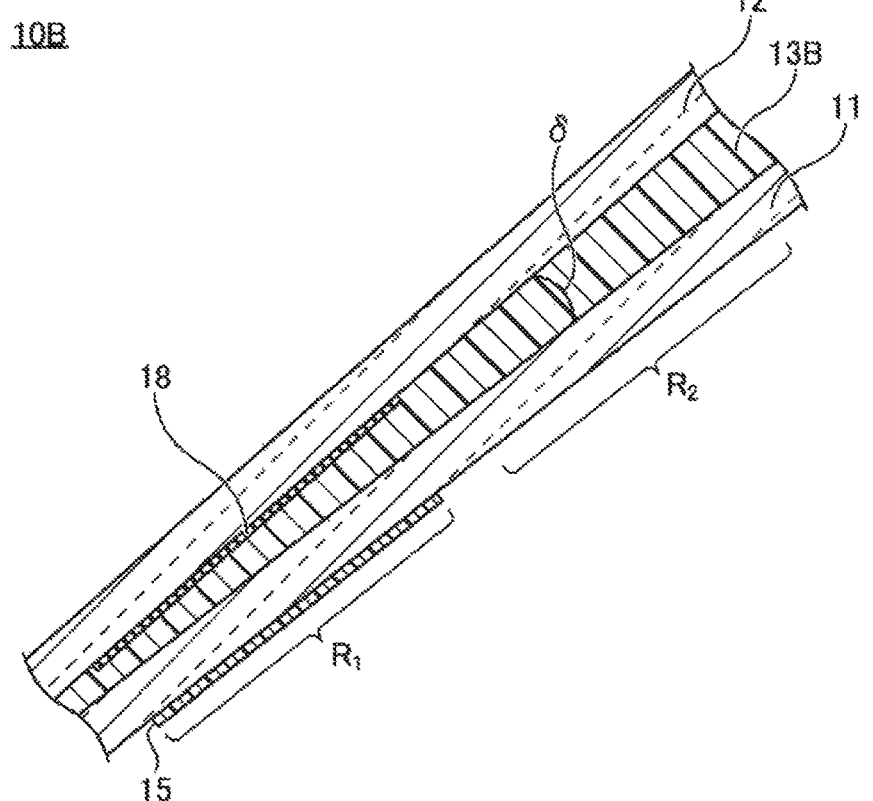

FIGS. 4A and 4B are views exemplifying the laminated glass according to the second embodiment, wherein FIG. 4A is a schematic view illustrating how the laminated glass is visually viewed from the vehicle inner side toward the vehicle outer side, and FIG. 4B is an enlarged cross-sectional and partial view taken along line B-B of FIG. 4A.

The HUD system according to the second embodiment is one wherein the laminated glass 10 in the HUD system 1 according to the first embodiment is replaced by a laminated glass 10B including an interlayer 13B. The laminated glass 10B shown in FIGS. 4A and 4B has two HUD display areas defined so as to be used by a head-up display unlike the laminated glass 10.

The laminated glass has a HUD area $R_1$ corresponding to the HUD area R according to the first embodiment, which has a P-polarized light reflective layer 15 and a light-absorbing layer 18 disposed therein. The laminated glass 10B has a HUD area $R_2$ disposed at a higher position than the HUD area $R_1$ when being mounted to a vehicle. The HUD area $R_2$ is an area that is irradiated with non-polarized light from a light source different from the light source 50. The HUD area $R_2$ has neither a P-polarized light reflective layer nor a light-absorbing layer disposed therein.

In the laminated glass 10B, the interlayer 13B is wedge-shaped in cross section in at least the HUD display region $R_2$. In other words, the interlayer 13B is wedge-shaped in cross section in at least the HUD display region $R_2$ such that the interlayer has a thickness gradually increasing toward an upper side from a lower side of the laminated glass 10B in a state that the laminated glass 10B is mounted to a vehicle. In this case, when a first glass plate 11 and a second glass plate 12 have a constant thickness, the interlayer 13B preferably has a wedge angle δ varying in a range of larger than 0 mrad and at most 1.0 mrad. This arrangement decreases the distance between a primary image and a double image to almost overlap the primary image and the double image, making the double image less noticeable.

The wedge angle δ is one obtained by dividing the difference in thickness between the upper and lower edges of the HUD display region $R_2$ in the vertical direction when the laminated glass 10B is installed to the vehicle, by the distance along the glass shape between the upper and lower edges. The increase in thickness from the lower edge side to the upper edge side of the laminated glass 10B may be a monotonic increase where the rate of increase is constant, or the rate of increase may vary in parts.

In the embodiment shown in FIGS. 4A and 4B, the interlayer 13B is formed in a wedge shape in cross section, although the interlayer is not limited to have such a shape. In other words, it is sufficient that at least one of the first glass plate 11, the second glass plate 12 or the interlayer 13B has a wedge-shaped area in cross section. For example, it is acceptable that the interlayer 13B has a constant thickness while the first glass plate 11 and/or the second glass plate 12 is formed in a wedge shape in cross section. The interlayer 13B may be formed in a wedge shape in cross section. In any of such cases, the total of wedge angles δ of the members is preferably larger than 0 mrad and at most 1.0 mrad. The total of wedge angles δ of the members is more preferably at least 0.15 mrad and at most 0.60 mrad. The total is further preferably at least 0.17 mrad. These arrangements decrease the distance between a primary image and a double image to almost overlap the primary image and the double image, making the double image less noticeable.

When the first glass plate 11 and the second glass plate 12 are produced, for example, by a float method, both glass plates can be formed in a wedge shape in cross section by devising the production conditions. Specifically, by adjusting peripheral speeds of a plurality of rolls disposed on both ends in the width direction of a glass ribbon traveling on a molten metal, the glass cross section in the width direction can be made concave, convex, or tapered, and a portion having an optional thickness change may be cut out.

The laminated glass 10B is configured so as to have the HUD display areas $R_1$ and $R_2$ disposed to have P-polarized light applied thereto such that at least one of the first glass plate 11, the second glass plate 12 or the interlayer 13B is wedge-shaped in cross section in at least the HUD display area $R_2$ as described above. This arrangement decreases the distance between a primary image and a double image to almost overlap the primary image and the double image, making the double image less noticeable.

The laminated glass plate 10B may be, for example, configured such that the HUD display $R_2$ constantly displays a vehicle speed while the HUD display $R_1$ displays an alarm or the like only when needed. It should be noted that the display information listed above is merely an example, and the display information is not limited to the listed ones.

WORKING EXAMPLE AND COMPARATIVE EXAMPLES

Now, an Example of the present invention, and Comparative Examples will be described. The present invention is not limited in any way to the example. It should be noted that Ex. 1 shows a working example while Ex. 2 and Ex. 3 are comparative examples.

Ex. 1

A first glass plate A and a second glass plate B were prepared such that the first glass plate was formed in a plate shape (commonly known as VFL, manufactured by AGC Inc.) as the inner plate (the glass plate on the vehicle inner side) when being made into a laminated glass, and the second glass plate was formed in a plate shape (commonly known as VFL, manufactured by AGC Inc.) as the outer plate (the glass plate on the vehicle outer side). Each of the first glass plate A and the second glass plate B had dimensions of 300 mm×300 mm×2 mm (in thickness). An interlayer C (PVB manufactured by Sekisui Chemical Co., Ltd., thickness: 0.76 mm) was prepared. Each of the first glass plate A, the second glass plate B and the interlayer C was not wedge-shaped in cross-sectional view and has a constant thickness.

Next, the first glass plate A had a P-polarized light reflective coating (stacked films made of $TiZrO_2/SiO_2$ having geometric film thicknesses of 73.9 nm/99.5 nm) wholly coated on its 4th surface as the vehicle inner side. On the other hand, the second glass plate B had a black ceramic layer (inorganic binder component: black ceramic paste ($Bi_2O_3$—$SiO_2$), inorganic powder component: $MnO_2$, inorganic binder component to inorganic powder component (weight ratio): 80:20 to 60:40) wholly formed as the light-absorbing layer on its 2nd surface as the vehicle inner side. Subsequently, the interlayer C was sandwiched between the first glass plate A with the P-polarized light reflective film coated thereon and the second glass plate B with the black ceramic layer formed thereon to form a laminate. The laminate was then bonded in a vacuum controlled in a gauge pressure range of –100 kPa to –65 kPa under a controlled temperature ranging from about 70° C. to about 110° C. Further, the laminate was subjected to a pressing process of heating and pressurizing under controlled conditions having a temperature range of 100° C. to 150° C., and an absolute pressure range of 0.6 MPa to 1.5 MPa, fabricating a laminated glass.

Ex. 2

A laminated glass was fabricated in the same way as Ex. 1 except that the first glass plate A had no P-polarized light reflective layer coated on its 4th surface as the inner side.

Ex. 3

A laminated glass was fabricated in the same way as Ex. 1 except that the second glass plate B had no black ceramic layer formed on its 2nd surface as the inner side.
Evaluation The laminated glass fabricated in each of Ex. 1 to Ex. 3 was positioned so as to be inclined at 33 deg to the horizontal. P-polarized visible light was irradiated at an incident angle of 57 deg on the 4th surface of each laminated glass from a light source, and the reflected light by each laminated glass was made incident to a filter to remove S-polarized light, followed by taking a picture of the reflected light by a camera disposed at the center of an eye box in accordance with SAE International SURFACE VEHICLE STANDARD J1757-2 (2018). The brightness of the primary image and the presence and absence of a double image in a HUD image taken with the camera were visually checked with respect to each laminated glass. On the other hand, P-polarized visible light was irradiated at an incident angle of 67 deg on the 4th surface of each laminated glass from the light source, and the brightness of a primary image and the presence and absence of a double image were visually checked with respect to each laminated glass in the same way. The HUD image was in a lattice pattern.

TABLE 1

|  |  | Ex. 1 | Ex. 2 | Ex. 3 |
|---|---|---|---|---|
| Position of P-polarized light reflective layer |  | 4th surface | Not applied | 4th surface |
| Position of light-absorbing layer |  | 2nd surface | 2nd surface | Not applied |
| Incident angle of 57 deg | Brightness of primary image | Acceptable | Unacceptable | Acceptable |
|  | Presence and absence of double image | Acceptable | — | Acceptable |
| Incident angle of 67 deg | Brightness of primary image | Acceptable | Unacceptable | Acceptable |
|  | Presence and absence of double image | Acceptable | — | Unacceptable |

The evaluation results are shown in Table 1. With respect to the brightness of the primary images, a case where the lattice was visually recognized in a sufficient manner was determined as being "acceptable" while a case where the lattice was not visually recognized in a sufficient manner was determined as being "unacceptable". With respect to the presence and absence of the double images, a case where the lattice was not seen double was determined as being "acceptable" while a case where the lattice was seen double was determined as being "unacceptable".

As shown in Table 1, the results of Ex. 1 and Ex. 3 revealed that the provision of the P-polarized light reflective layer on the 4th surface can obtain a primary image in a sufficiently bright manner and produces no double image when P-polarized visible light was applied to each laminated glass at an incident angle of 57 deg. However, when the incident angle was 67 deg, a double image was seen in Ex. 3.

This is because it is supposed that no light-absorbing layer was disposed in Ex. 3, causing the incident angle to shift from the Brewster angle (57 deg) to increase the amount of light reflected on a surface of the laminated glass closer to the vehicle outer side than the P-polarized light reflective layer. In contrast, it is supposed in Ex. 1 that the light-absorbing layer was disposed to reduce the reflection of light on a surface of the laminated glass closer to the vehicle outer side than the P-polarized light reflective layer even when the incident angle shifted from the Brewster angle (57 deg), with the result that no double image was seen.

The results of Ex. 2 reveal that even when the light-absorbing layer is disposed, the P-polarized visible light from the light source is little reflected in the absence of a P-polarized light reflective layer, and that the laminated glass in this example is not appropriate as the laminated glass for HUD systems because a primary image becomes dark whatever the incident angle is. It should be noted that in the laminated glass of Ex. 2, the checking of the presence and absence of a double image was impossible because the primary image was dark.

TABLE 2

|  |  | Ex. 1 | Ex. 2 | Ex. 3 |
|---|---|---|---|---|
| P-Polarized light transmittance [%] |  | 0 | 0 | 77.3 |
| S-Polarized light transmittance [%] |  | 0 | 0 | 77.3 |
| Visible light transmittance Tv [%] |  | 0 | 0 | 77.3 |
| Visible light reflectance Rv [%] |  | 4.6 | 4.5 | 15.9 |
| Absorptivity A [%] |  | 95.4 | 95.5 | 6.8 |
| P-Polarized light reflectance Rvp (Incident angle of 57 deg) [%] |  | 10.3 | 0 | 10.8 |
| S-Polarized light reflectance Rvs (Incident angle of 57 deg) [%] |  | 6.3 | 16.5 | 17.5 |
| Average reflectance of P-polarized light and S-polarized light (Incident angle of 57 deg) [%] |  | 8.3 | 8.3 | 14.2 |
| Chromaticity of P-polarized light (Incident angle of 57 deg) | a* | −2.3 | 0 | −2.0 |
|  | b* | 2.7 | −0.2 | 3.5 |

Primary optical properties were checked with respect to the P-polarized light reflective layer and the light-absorbing layer of the laminated glass fabricated in each of Ex. 1 to Ex. 3. The checking results are shown in Table 2.

The comparison of Ex. 3 to Ex. 1 and Ex. 2 reveals that the absence of a light-absorbing layer causes the P-polarized light transmittance and the S-polarized light transmittance of the P-polarized light reflective layer and the light-absorbing layer to be at least 77% in (Ex. 3), and that the presence of a light-absorbing layer causes the P-polarized light transmittance and the S-polarized light transmittance of the P-polarized light reflective layer and the light-absorbing layer to be 0% (Ex. 1 and Ex. 2).

The comparison of Ex. 3 to Ex. 1 and Ex. 2 reveals that the absence of a light-absorbing layer causes the visible light absorptivity A to be lowered to at most 7% (Ex. 3), and that the presence of a light-absorbing layer causes the visible light absorptivity A to be increased to at least 90%, in particular at least 95% (Ex. 1 and Ex. 2). Since the reflection on a surface of the laminated glass closer to the vehicle outer side than the P-polarized reflective layer can be reduced by setting the visible light absorptivity at at least 85% as described above, the occurrence of a double image can be reduced. This condition is sufficiently satisfied by Ex. 1 and Ex. 2.

The comparison of Ex. 2 to Ex. 1 and Ex. 3 reveals that the absence of a P-polarized light reflective layer causes the P-polarized light reflectance Rvp at an incident angle of 57 deg to be 0% (Ex. 2), and that the presence of a P-polarized light reflective layer causes the P-polarized light reflectance Rvp at an incident angle of 57 deg to be at least 10% (Ex. 1 and Ex. 3). When the P-polarized light reflectance Rvp at an incident angle of 57 deg is at least 5% as described above, a primary image is made bright in a sufficient manner to improve the visibility of a HUD image. This condition is sufficiently satisfied by Ex. 1 and Ex. 3.

With respect to the chromaticity of P-polarized light at an incident angle of 57 deg, any of Ex. 1 to Ex. 3 satisfied the formulas of a*≤10 and b*≤10, in particular, a*≤5 and b*≤5 in terms of absolute value. With respect to the chromaticity of P-polarized light at an incident angle of 57 deg, it is supposed that a problem would be caused when the light-absorbing layer has a color other than a dark color, or another case.

To summarize the above, the provision of both of a P-polarized light reflective layer and a light-absorbing layer as in Ex. 1 can cause the visible light absorptivity A to be set at at least 85% and the P-polarized light reflectance Rvp at an incident angle of 57 deg to be set at least 5%. This arrangement can obtain a HUD image such that a primary image is sufficiently bright and the occurrence of a double image is reduced, even when the incident angle shifts from 57 deg.

In the above-mentioned examples, only the result at an incident angles of 57 deg and 67 deg are shown. The inventors confirmed that a HUD image was obtained by the laminated glass of Ex. 1 such that a primary image was sufficiently bright with the occurrence of a double image being reduced even in the case of an incident angle of 72 deg. In principle, it is supposed that a HUD image can be achieved in the laminated glass of Ex. 1 such that a primary image is sufficiently bright with the occurrence of a double image being reduced even when the incident angle is smaller than 57 deg.

As described above, preferred embodiments and the like have described in detail. The present invention is not limited to the embodiments or the like. Various variations and replacement may be made to the embodiments or the like without departing from the scope defined in Claims.

This application is a continuation of PCT Application No. PCT/JP2022/020984, filed on May 20, 2022, which is based upon and claims the benefit of priority from Japanese Patent Application No. 2021-085617 filed on May 20, 2021. The contents of those applications are incorporated herein by reference in their entireties.

EXPLANATION OF REFERENCES

1: HUD System
10, 10A, 10B: Laminated Glass
11: First Glass Plate
12: Second Glass Plate
13 and 13B: Interlayer
14: Optically Shielding Layer
14A and 18: Light-absorbing Layer
15: P-polarized Light Reflective Layer
50: Light Source
60: First Optical System

70: Image Display Element
80: Second Optical System
90: Concave Mirror

What is claimed is:

1. A laminated glass comprising:
a first glass plate, a second glass plate, and an interlayer disposed between the first glass plate and the second glass plate to bond the first glass plate and the second glass plate;
the laminated glass partly having a first area configured to be used by a head-up display;
the first glass plate having a 4th surface disposed on an opposite side of the interlayer, and a 3rd surface facing the interlayer;
the second glass plate having a 2nd surface facing the interlayer and a 1st surface disposed on an opposite side of the interlayer;
the first area having a P-polarized light reflective layer disposed on the 4th surface and a light-absorbing layer disposed at a position closer to the 1st surface than the P-polarized light reflective layer; and
the laminated glass being configured such that the formula of A≥85% is satisfied wherein the total of a visible light transmittance of the P-polarized light reflective layer and a visible light transmittance of the light-absorbing layer is Tv %, the total of a visible light reflectance of the P-polarized light reflective layer and a visible light reflectance of the light absorbing layer is Rv %, and an absorption A is equal to "100−Tv−Rv" (%); and
the laminated glass being configured such that the formula of Rvp≥5% is satisfied wherein the total of a P-polarized light reflectance of the P-polarized light reflective layer and a P-polarized light reflectance of the light-absorbing layer is Rvp % when P-polarized light is incident on the surface of the laminated glass facing the P-polarized light reflective layer at an incident angle of 57 deg.

2. The laminated glass according to claim 1, wherein the laminated glass is configured such that the formula of a*≤10 and the formula of b*≤10 are satisfied wherein light reflected on the P-polarized light reflective layer and on the light-absorbing layer has a chromaticity of a*, b* when the P-polarized light is incident on the P-polarized light reflective layer at an incident angle of 57 deg.

3. The laminated glass according to claim 1, wherein the light-absorbing layer is disposed on the 2nd surface.

4. The laminated glass according to claim 3, wherein the 2nd surface has an optically shielding layer disposed thereon in a strip form along a peripheral edge portion thereof; and
wherein the optically shielding layer is partly widened so as to form the light-absorbing layer.

5. The laminated glass according to claim 1, wherein the light-absorbing layer comprises a colored ceramic layer.

6. The laminated glass according to claim 1, wherein the first glass plate is curved so as to be convex toward the interlayer.

7. The laminated glass according to claim 1, wherein at least one of the first glass plate, the second glass plate or the interlayer has a wedge-shaped area in cross section such that the wedge-shaped area has a thickness gradually increasing from a lower side to an upper side of the laminated glass in a state that the laminated glass is mounted to a vehicle.

8. The laminated glass according to claim 7, wherein the wedge-shaped area in cross section includes a second area configured to be used by the head-up display.

9. A head-up display system comprising:

the laminated glass recited in claim 1, comprising a light source emitting P-polarized visible light such that the P-polarized visible light is incident on the P-polarized light reflective layer;

wherein a ghost image is apparently displayed on a vehicle outer side of the laminated glass.

10. The head-up display system according to claim 9, configured such that light from the light source is incident on the P-polarized light reflective layer at an incident angle larger than 57 deg.

11. The head-up display system according to claim 9, configured such that light from the light source is incident on the P-polarized light reflective layer at an incident angle of at most 47 deg, or at least 62 deg.

\* \* \* \* \*